United States Patent
Maes et al.

(10) Patent No.: US 8,028,073 B2
(45) Date of Patent: Sep. 27, 2011

(54) MOBILE MEETING AND COLLABORATION

(75) Inventors: Stephane H. Maes, Fremont, CA (US); John Dolan, San Francisco, CA (US); Gaurav Kuchhal, Mountain View, CA (US); Jacob Christfort, Novato, CA (US); Jean Sini, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 406 days.

(21) Appl. No.: 12/060,156

(22) Filed: Mar. 31, 2008

(65) Prior Publication Data

US 2009/0013045 A1 Jan. 8, 2009

Related U.S. Application Data

(63) Continuation-in-part of application No. 10/857,659, filed on May 28, 2004, now Pat. No. 7,379,733.

(60) Provisional application No. 60/482,513, filed on Jun. 25, 2003.

(51) Int. Cl.
*G06F 15/16* (2006.01)
*H04M 3/42* (2006.01)

(52) U.S. Cl. ........ 709/227; 709/204; 709/206; 709/207; 709/248; 379/202.01; 379/204.01

(58) Field of Classification Search ........... 709/227–229
See application file for complete search history.

(56) References Cited

U.S. PATENT DOCUMENTS

| | | | |
|---|---|---|---|
| 5,497,373 A | 3/1996 | Hulen et al. | |
| 5,850,517 A | 12/1998 | Verkler et al. | |
| 6,157,941 A | 12/2000 | Verkler et al. | |
| 6,163,274 A | 12/2000 | Lindgren | |
| 6,363,352 B1 * | 3/2002 | Dailey et al. | 705/9 |
| 6,430,624 B1 | 8/2002 | Jamtgaard et al. | |
| 6,463,078 B1 | 10/2002 | Engstrom et al. | |
| 6,473,609 B1 | 10/2002 | Schwartz et al. | |
| 6,535,486 B1 | 3/2003 | Naudus et al. | |
| 6,549,937 B1 | 4/2003 | Auerbach et al. | |

(Continued)

OTHER PUBLICATIONS

U.S. Appl. No. 10/851,049, filed May 21, 2004, Office Action mailed Nov. 25, 2008, 18 pages.

(Continued)

*Primary Examiner* — Ian N Moore
*Assistant Examiner* — Thai N Nguyen
(74) *Attorney, Agent, or Firm* — Kilpatrick Townsend & Stockton LLP

(57) ABSTRACT

A method for coordinating the remote participation of a client device in a meeting within a network comprising the client device and one or more nodes, the meeting involving a multimedia presentation. According to one embodiment, the method includes receiving an invitation for the client device to participate in the meeting, where a user will participate in the meeting using the client device. Temporal information for the meeting is stored. Furthermore, it is determined whether or not to notify the user of the meeting based on the stored temporal information or other information. In the event that the user should be notified, it is determined when to notify the user of the meeting based on the stored temporal information. One or more messages about the meeting are sent for the meeting. In one embodiment, the one or more messages about the meeting includes a reminder to join the meeting. In another embodiment, the one or more messages about the meeting includes an instruction which causes the client device to connect to the meeting without user action.

33 Claims, 6 Drawing Sheets

U.S. PATENT DOCUMENTS

| | | |
|---|---|---|
| 6,629,163 B1 | 9/2003 | Balassanian |
| 6,636,888 B1 * | 10/2003 | Bookspan et al. ............ 709/203 |
| 6,732,103 B1 * | 5/2004 | Strick et al. ........................... 1/1 |
| 6,738,822 B2 | 5/2004 | Fukasawa et al. |
| 6,856,809 B2 | 2/2005 | Fostick |
| 6,868,143 B1 | 3/2005 | Menon et al. |
| 6,871,236 B2 | 3/2005 | Fishman et al. |
| 7,058,626 B1 | 6/2006 | Pan et al. |
| 7,379,733 B2 | 5/2008 | Maes et al. |
| 7,519,720 B2 | 4/2009 | Fishman et al. |
| 7,529,853 B2 | 5/2009 | Maes |
| 2002/0087704 A1 | 7/2002 | Chesnais et al. |
| 2002/0118809 A1 | 8/2002 | Eisenberg |
| 2002/0159394 A1 * | 10/2002 | Decker et al. ................. 370/252 |
| 2002/0163934 A1 | 11/2002 | Moore et al. |
| 2003/0054810 A1 | 3/2003 | Chen et al. |
| 2003/0093462 A1 * | 5/2003 | Koskelainen et al. ......... 709/203 |
| 2003/0104805 A1 | 6/2003 | Weksel |
| 2003/0187930 A1 | 10/2003 | Ghaffar et al. |
| 2003/0191805 A1 | 10/2003 | Seymour et al. |
| 2003/0208546 A1 | 11/2003 | DeSalvo et al. |
| 2003/0211856 A1 | 11/2003 | Zillacus |
| 2004/0015723 A1 | 1/2004 | Pham et al. |
| 2004/0119814 A1 | 6/2004 | Clisham et al. |
| 2004/0152454 A1 | 8/2004 | Kauppinem |
| 2004/0218744 A1 * | 11/2004 | Nguyen et al. ........... 379/202.01 |
| 2004/0266408 A1 | 12/2004 | Maes |
| 2005/0021624 A1 | 1/2005 | Herf et al. |
| 2005/0101338 A1 | 5/2005 | Kraft |
| 2005/0144233 A1 | 6/2005 | Kjesbu et al. |
| 2006/0013205 A1 | 1/2006 | Daniell et al. |
| 2009/0006576 A1 | 1/2009 | Kaufman et al. |
| 2009/0031284 A1 | 1/2009 | Shenfield et al. |

OTHER PUBLICATIONS

U.S. Appl. No. 10/851,049, filed May 21, 2004, Final Office Action mailed Apr. 15, 2009, 11 pages.

U.S. Appl. No. 10/851,049, filed May 21, 2004, Advisory Action mailed Oct. 19, 2009, 3 pages.

U.S. Appl. No. 10/851,049, filed May 21, 2004, Office Action mailed Feb. 4, 2010, 22pages.

U.S. Appl. No. 10/857,659, filed May 8, 2004, Office Action mailed Jan. 24, 2007, 14 pages.

U.S. Appl. No. 10/857,659, filed May 8, 2004, Final Office Action mailed May 31, 2007, 15 pages.

U.S. Appl. No. 10/857,659, filed May 8, 2004, Notice of Allowance mailed Dec. 31, 2007, 7 pages.

U.S. Appl. No. 10/850,841, filed May 21, 2004, Office Action mailed Apr. 29, 2008, 7 pages.

U.S. Appl. No. 10/850,841, filed May 21, 2004, Final Office Action mailed Nov. 12, 2008, 7 pages.

U.S. Appl. No. 10/850,841, filed May 21, 2004, Notice of Allowance mailed Feb. 25, 2009, 9 pages.

U.S. Appl. No. 10/851,049, filed May 21, 2004, Final Office Action mailed Jul. 16, 2010, 24 pages.

U.S. Appl. No. 10/851,049, filed May 21, 2004, Office Action mailed Dec. 30, 2010, 21 pages.

* cited by examiner

MOBILE MEETING AND COLLABORATION

CROSS-REFERENCES TO RELATED APPLICATIONS

This application is a continuation-in-part of and claims priority from U.S. patent application Ser. No. 10/857,659, filed May 28, 2004, which claims the benefit of the filing date of U.S. Provisional Patent Application No. 60/482,513, filed Jun. 25, 2003, both of which are incorporated by reference.

BACKGROUND OF THE INVENTION

The present invention generally relates to meetings and collaboration. More particularly, the present invention relates to methods and apparatus for enabling client devices to schedule and participate in meetings.

Meetings typically include some kind of multimedia presentation, for example, a slide show presentation. Thus, people who are not present at the slide show will not fully appreciate the presentation. A person not at the meeting may participate through a teleconference and manually change hard copies of the presentation media or multimedia, such as slides while the presentation is being given. However, the person must be given a verbal cue when the presentation media or multimedia are changed or determine on his or her own that a new slide is being displayed.

Currently, a presentation being given may be displayed on a remote television or computer through a video conference. This, however, requires expensive video conferencing equipment and a dedicated high-speed Internet connection. Also, the remote location is typically another meeting room in a remote office thereby requiring users to be present in the meeting room. Thus, if a user is traveling, a user may not have access to the required equipment to participate in a video conference. Rather, the user may only have a client device, such as a cellular phone. In this case, the user may participate through a tele-conference and manually change physical copies of the presentation media or multimedia, such as slides. However, once again, the user must receive cues that the slides have been changed or decide when to change the slides.

In all of the above cases, the user has been a participant in the meeting and not the presenter. If the user is not present and is, for example, at an airport, the user cannot effectively run the presentation. Once again, the user may only have a client device, such as a cellular phone; thus, the user cannot change the slides of a presentation for everyone in the meeting to see. Rather, the user is restricted to participating through a tele-conference while the slides of the presentation are changed by someone else. In this case, the user must verbally say when slides should be changed.

In another example, a user may schedule a meeting, such as a tele-conference. Reminders may be sent to a client device when a meeting is about to begin. However, the reminders may just indicate that a meeting will start at a certain time. At the time of receiving the reminder, the user may not have access to information needed to connect to the tele-conference because the user may not be in his or her office, etc. Thus, the reminder would be useless because the user cannot connect to the meeting.

Accordingly, what is desired are methods and apparatus for addressing the above drawbacks for scheduling and participating in meetings via client devices.

BRIEF SUMMARY OF THE INVENTION

Embodiments of the present invention relate to the coordination and participation in meetings using a client device. A user of a client device may be automatically reminded and connected to a meeting. Further, the user can automatically view presentation media or multimedia, such as slides in a presentation as they are changed and run a presentation using a client device.

In one embodiment, a method for enabling a client device to view one or more slides in a presentation is provided. The method comprises: determining when slides for the presentation have been changed; when a slide has been changed, performing the steps of: determining a current slide in the one or more slides being displayed; and sending a message, to the client device, indicating that the current slide has been displayed, wherein the message enables the current slide to be displayed on the client device.

In another embodiment, a method for running a presentation of one or more slides from a client device is provided. The presentation is being viewed by one or more participants using one or more computing devices that are in communication with one or more display devices associated with the one or more participants. The method comprises: receiving a message to display a new slide for the presentation from the client device that is remotely located from the one or more display devices; determining the one or more display devices that are participating in the meeting; and sending a message indicating that a new slide should be displayed to each of the one or more display devices, wherein the message causes the one or more display devices to display the new slide.

In one embodiment, a method for coordinating the remote participation of a client device in a media or multimedia meeting/session/conference within a network comprising the client device and a node, is provided. The method includes receiving an invitation for the client device to participate in the meeting, where a user will participate in the meeting using the client device. The meeting may be a media meeting, such as a voice conference like a phone call or a voice-over-IP call among two or more parties. The meeting may also be a multimedia meeting. For example, the meeting may be a video broadcast or session, a voice or phone conference, a web conference, or other single or multimedia conference or meeting. As used herein, the foregoing are referenced by the term media or multimedia meeting, conference, or call. In one embodiment, the invitation includes meeting details, such as how to join the meeting and/or temporal information about the meeting. The invitation may also provide presentation materials in advance of the meeting. For example, presentation media or multimedia, such as slides that are to be presented during the meeting may be provided by the invitation before the meeting is started. The method further includes storing temporal information about the meeting and determining whether to remind the user of the meeting based on the stored temporal information or other information. In one embodiment, information about where a reminder or notification message about the meeting should be sent may also be stored. This information may be stored on the same device that stores the temporal information or on a different device. Moreover, this information may be provided by a user in preferences, or after an invitation has been accepted. For example, a user may reply with an acceptance and the reply may include the number or address of another device to which the notification or reminder should be sent. In the event that the user should be notified, it is determined when to notify the user of the meeting based on the stored temporal information and a notification or reminder message about the meeting is sent.

The notification message about the meeting may enable the client device to connect to the meeting such as by inviting the client to the meeting and/or causing the client to connect to the meeting. In a first embodiment, the message may include an instruction which causes the client device to connect to the meeting when the client device receives the message, where the client device is connected to the meeting without user action. The message may cause the client device to initiate a call for the meeting and be automatically connected to the meeting. A server (i.e., conference/meeting server) may receive the notification message and start a call to the client which causes the client device to automatically connect to the meeting. A third party may receive the notification message and may call the client device and the meeting into a call session or a media session, in a third party call control, such as a session initiation protocol ("SIP") back-to-back user agent ("B2BUA"). In a second embodiment, after determining when to notify the user of the meeting, the message may include a reminder that is sent or displayed for interaction. For example, the reminder to join the meeting is sent to the user by an application or service (i.e., operating system) of the client device. Reminders may also be sent by a server, peer device, and/or third party.

In the context of a session initiation protocol (SIP) method invitation, in one embodiment, the instruction may notify the client about how to join the meeting (e.g. where it can send a SIP invitation). Moreover, the instruction may also be sent as a notification about the meeting to the conference/media server, which then sends the SIP invite to the client. In another embodiment, the instruction notifies a third party system about how to join the client and the meeting (e.g. third party call and/or media session control between the client and a meeting and/or a media server). The third party may initiate a third party call or media session in a third party call control mode. For example, in SIP, the third party may act as a B2BUA It should be appreciated that communications among nodes in the network are accomplished without a specific communication or messaging channel, restriction, or assumption. In one embodiment, a node in the network calls the client device to join the meeting. The meeting may involve a media or multimedia presentation, voice over internet protocol (voIP), web conference as media, video conference, and the like. In another embodiment, the node on the network asks the client device to join the meeting. For example, the client device can itself call or join the meeting and/or access the presentation.

Embodiments may also be included on computer readable media. A further understanding of the nature and the advantages of the embodiments disclosed herein may be realized by reference of the remaining portions of the specification and the attached drawings.

DETAILED DESCRIPTION OF THE INVENTION

Embodiments described herein allow a user to use a client device to coordinate and set up meetings. The client device is sent a reminder for a meeting that may automatically connect the client device to the meeting or include a link that, upon selection, will automatically connect the user to the meeting. Also, the user of a client device may participate in a meeting where a presentation is being given. The presentation media or multimedia, such as slides of a presentation are automatically changed on the client device as they are changed in the presentation being given. Additionally, a user giving a presentation may use the client device to cause presentation slides to be changed automatically on other devices.

Figure 1:
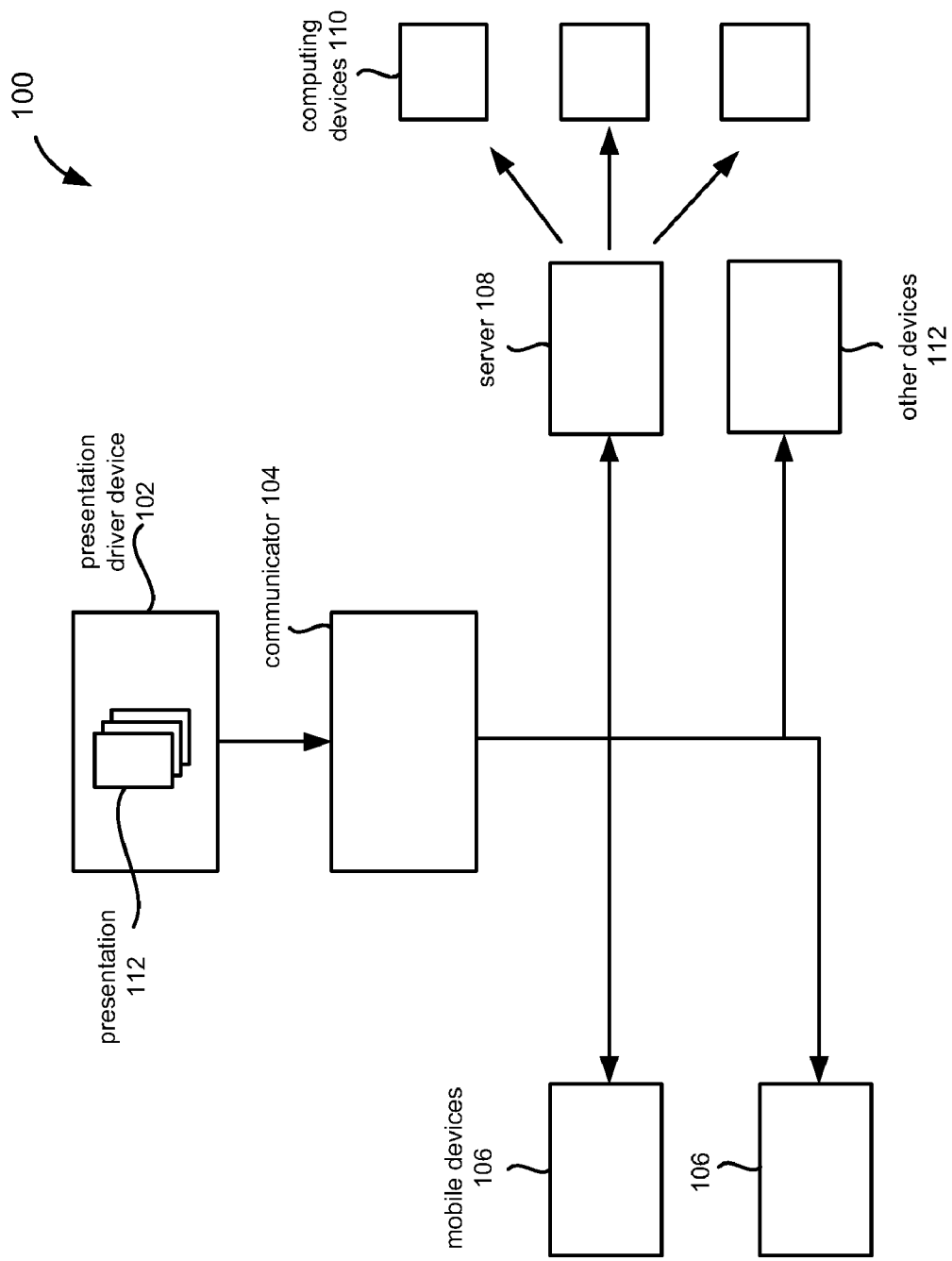
FIG. 1 depicts a system for providing a presentation according to one embodiment.

FIG. 1 depicts a system 100 for providing a presentation according to one embodiment. System 100 includes a presentation driver device 102, a communicator 104, client devices 106, a server 108, computing devices 110, and other devices 112.

Client devices 106 are any devices that can receive communications from communicator 104. Examples include cellular phones, personal assistants (PDAs), personal computers, pagers, etc.

Server 108 and computing devices 110 are included to represent a computer network, such as a corporate network. Server 108 receives messages from communicator 104 and propagates them to computing devices 110.

Other devices 112 may be any computing devices, another presentation driver device 102 in another office, a television, a display screen, or any other device configured to display slides from presentation 112.

Presentation driver device 102 is any device that is used to display a presentation on a display device. For example, presentation driver device 102 is a computing device that includes or can retrieve presentation media or multimedia, such as slides from presentation 112. For example, a personal computer that has a slide show presentation stored locally may be used. Presentation 112 is typically an electronic document that includes one or more pages or slides. Presentation driver device 102 display pages for presentation 112 on a television, screen, computer, etc.

When a slide should be changed, a user sends a command to presentation driver device 102. For example, when a user desires to display the next slide in presentation 112, the user may select a key on an input device of presentation driver device 102, such as a keyboard or mouse. Presentation driver device 102 would then display the next slide on the display.

In one embodiment, client devices 106 are devices that are not directly connected to presentation driver device 102. For example, presentation driver device 102 may be a laptop that includes software to display a slide on a screen. Also, software may be used to display the slide on a screen remotely, as in a teleconference. These examples require specialized presentation software that is configured to display presentation media or multimedia, such as slides from presentations. Client devices 106 may not be configured to directly interact with presentation driver device 102. For example, the communication channel that client devices 102 communicate in may not allow for slides as formatted (e.g., a Microsoft Powerpoint™ format) in presentation driver device 102 to be sent. Client devices may communicate using any appropriate messages such as SMS or MMS, and thus messages in SMS or pictures of slides in MMS may need to be sent. In another embodiment, when not mobile, SIP/SIMPLE or email may be used.

Accordingly, as will be described below, communicator 104 may send a message that the slide has been changed or it may send a message that includes an image of the current slide being displayed. When a new slide is displayed, presentation driver device 102 sends a message to communicator 104 indicating that a new slide has been displayed. In another embodiment, communicator 104 may periodically monitor the status of presentation 112 and determine when a change in presentation 112 has occurred. When a new slide has been displayed, communicator 104 sends messages to client devices 106, server 108, and other devices 112 to notify them of the slide change. If a message that the slide has been changed is sent, the message may cause the receiving device to automatically retrieve and display the currently displayed slide. If an image of the slide is sent, the message may cause the receiving device to automatically display the received slide.

Figure 2:
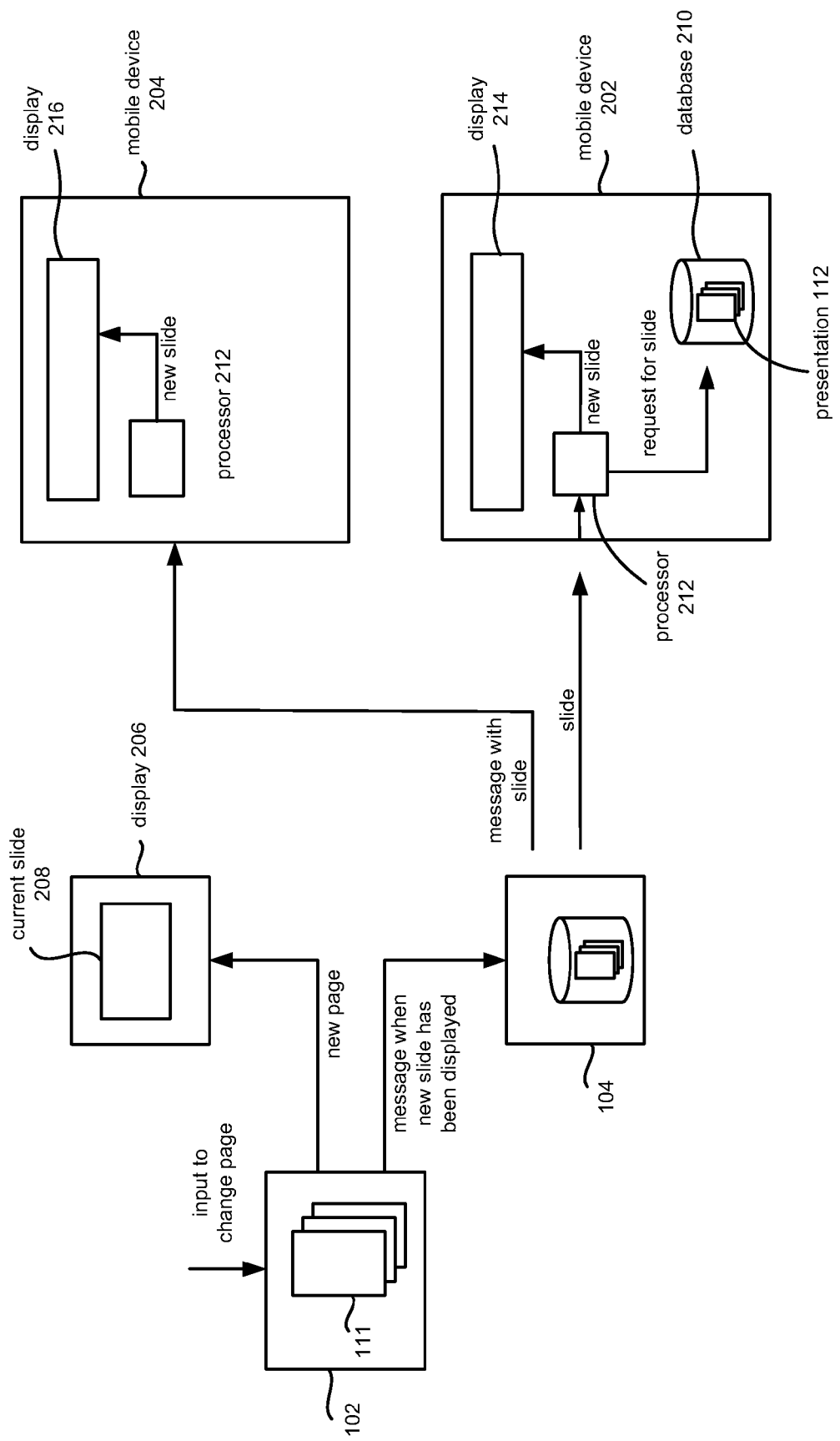
FIG. 2 illustrates the embodiment where users view slides in a presentation using client devices.

In one embodiment, a user uses a client device 106 to view slides in a presentation being given by another and also uses client device 106 to give a presentation. FIG. 2 illustrates the embodiment where users view slides in a presentation 112 using client devices. In one embodiment, a client device 202 includes a copy or can retrieve a copy of the slides of presentation 112 and a client device 204 cannot access any slides of presentation 112.

As shown, presentation driver device 102 receives input to change a page of presentation 112. For example, a next page key may be pressed on a computer. Presentation driver device 102 then sends a current slide 208 to a display 206 for display. When a new page has been accessed in presentation 112, a message is sent to communicator 104. In another embodiment, communicator 104 may monitor presentation driver device 102 and determine when a new page has been displayed. Communicator 104 is then configured to determine the current slide being displayed and send a message to client devices 202 and 204 that indicates which slide is being displayed. Also, client devices 202 may query communicator 104 for the slide to display. The messaging may be different between client devices depending on if the client device does or does not have access to slides in presentation 112.

In the case where the client device can retrieve slides in presentation 112, communicator 104 sends a message that causes client device 202 to display current slide 208 on a display 214. The message may be sent using any communication means that can be used to contact device 202, such as short message service (SMS), multimedia messaging service (MMS), email, wireless application protocol (WAP) Push, General Packet Radio System (GPRS) Push, etc.

As shown, client device 202 includes a database 210 that stores presentation 1 12. Although database 210 is shown in client device 202, database 210 may be located remotely from client device 202. In this case, client device 202 may retrieve pages in presentation 112 from the remotely located database 210. For example, presentation 112 may be located on a server and client device 202 can request a web page that would include current slide 208.

Processor 212 is configured to display the next slide in presentation 112 on a display 214 in response to the message. For example, the message may indicate that a new slide has been displayed. In another embodiment, the message may identify the slide that is currently being displayed. Processor 212 will then retrieve that slide from database 210. For example, a page or slide number may be sent to client device 202 and that page will be retrieved and displayed. Accordingly, a presentation may display slides out of order and client device 202 can still display the right slide. In either case, the message will cause client device 202 to automatically display the currently displayed slide in the presentation upon receiving the message. In another embodiment, a button or link may be automatically displayed where the new slide is displayed when the button is selected.

In the case where client device 204 cannot retrieve slides in presentation 112, communicator 104 sends a message with current slide 208. The message may be sent using MMS or any other methods that may send the page to client device 204. Also, a remote server containing a copy of presentation 112 may be used to send current slide 208 to client device 204 instead of communicator 104. In this case, communicator 104 sends a message to the server and the server sends current slide 208 to client device 204. For example, client device 204 may download web pages that display current slide 208.

In one embodiment, the slide may be adapted to characteristics associated with different client devices. For example, the slide may have been designed using hypertext markup language (HTML) or a Microsoft Powerpoint™ format but client device 204 may only be able to display text pages. Communicator 104 can convert the slide to text and send the text page for display by client device 204. In another example, SMS messages may be the only way to reach client device 204. The HTML page may then be converted into text and sent in SMS messages to client device 204. Thus, the page may be sent through different communications methods and/or adapted to different display requirements.

In one embodiment, the messaging between communicator 104 and client device 204 is messaging that requires a low bandwidth. For example, SMS and MMS messages may be sent quickly through networks and are widely supported by many devices. However, in order to view a direct video link to a presentation, expensive and bulky equipment is often needed. Also, a high bandwidth connection is needed.

Once client device 204 receives current slide 208, the message causes processor 212 to automatically display current slide 208 on a display 216. In another embodiment, client device 204 may forward the slide to a fax machine or printer so the page can be faxed or printed. The slide may then be viewed in the hard copy form from the copy generated by the fax machine or printer.

In one embodiment, communicator 104 may not be able to send a message with current slide 208 to client device 204. In this embodiment, a message with a link, such as a uniform resource locator (URL), may be sent to client device 204. The link may be used to download a web page that displays current slide 208. The web page may include options that allow the user to choose a format to adapt current slide 208 to the specifications of client device 204. Client device 204 may also send this URL to other devices allowing other users to view slides in presentation 112.

In another embodiment, communicator 104 may cause another device that includes presentation 112 to send current slide 208 to client device 204. For example, upon receiving a message that a new slide has been displayed, client device 202 sends the new slide from its database 210 to client device 204.

In another embodiment, client device 202 and client device 204 may not receive messages initiated by communicator 104; rather, client device 202 and 204 may monitor communicator 104 to determine if a page in presentation 112 has been changed. For example, client devices 202 and 204 may check periodically (e.g., every couple of seconds) to determine if a page has been changed. If a page has changed, client device 202 may determine which page is currently being displayed or client device 204 may retrieve the currently displayed page from communicator 104.

In another embodiment, client device 202 or 204 may need to know the current slide being displayed. For example, a client user may be late for the meeting and instead of interrupting the meeting by asking what page is being displayed, the user uses client device 202 or 204 to query communicator 104 for the currently displayed page. In this case, communicator 104 will either send a message to client device 202 indicating which slide is being displayed or send current slide 208 to client device 204.

Figure 3:
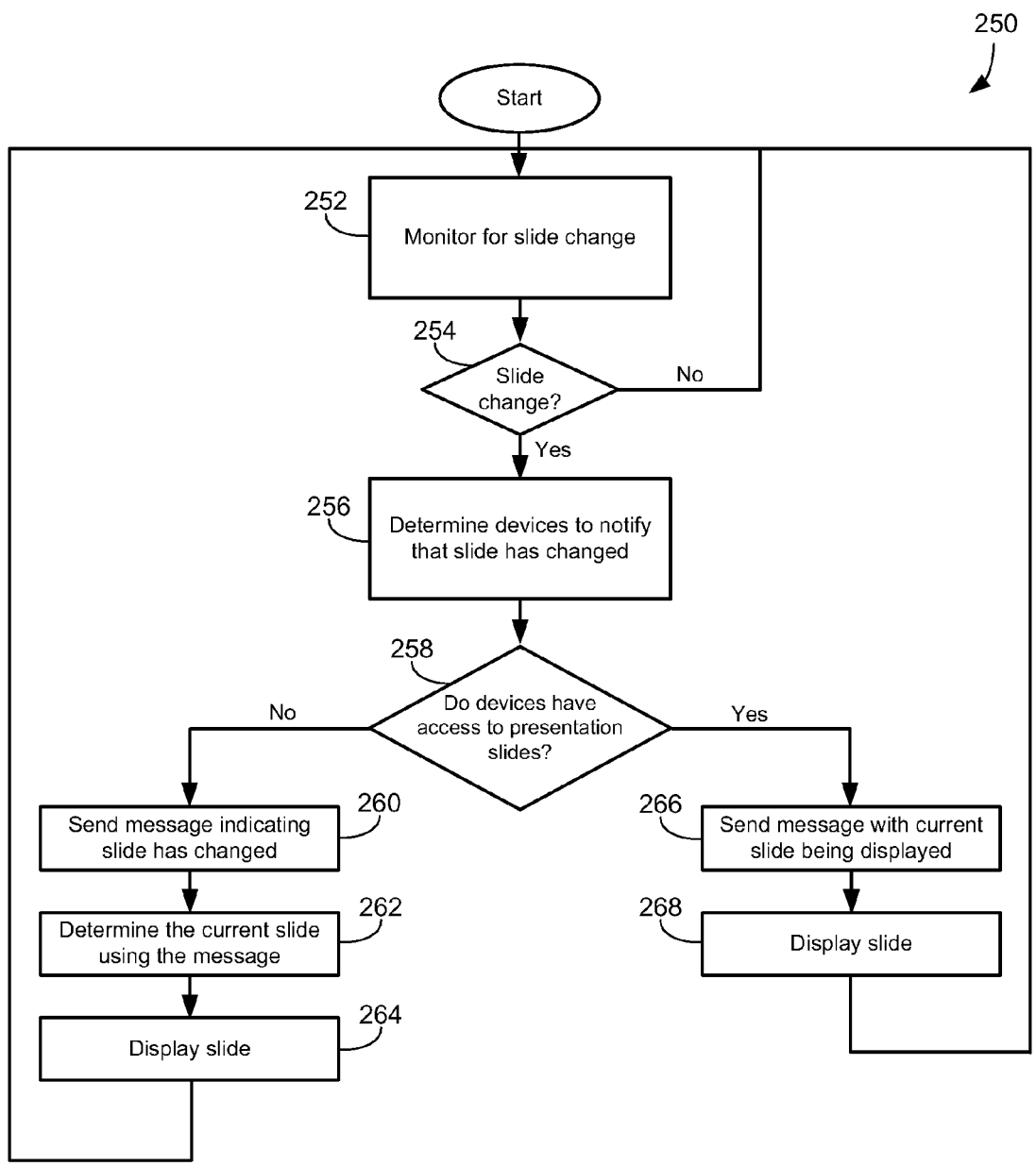
FIG. 3 depicts a flowchart of a method for synchronizing client devices with displayed slides in a presentation according to one embodiment.

FIG. 3 depicts a flowchart 250 of a method for synchronizing client devices with displayed slides in a presentation according to one embodiment. In step 252, communicator 104 monitors presentation driver device 102 for changes in displayed slides. Driver device 102 may send messages to communicator 104 or communicator 104 may periodically send requests to driver device 102 to determine if a new slide has been displayed.

In step 254, communicator 104 determines if a slide has changed. If a new slide has not been displayed, communicator 104 continues to monitor for slide changes in step 252.

If a new slide has been displayed, in step 256, communicator 104 determines devices that are participating in the presentation. For example, client devices, personal computers, televisions, etc. may need to display the new slide. In order to determine the devices, communicator 104 may require that devices have previously registered for participation in the meeting. In registering, the devices may configure the communication methods in which communicator 104 will send messages. For example, client devices may be sent messages through SMS and MMS, televisions/multimedia streaming/broadcasts may be sent messages through a video link, etc.

In step 258, after determining the devices that need the slide, communicator 104 determines if the devices can access slides of presentation 112. If the devices cannot access the slides, in step 260, communicator 104 sends a message indicating that a slide has changed to the devices. The message may specify a slide (e.g., a slide number) that should be displayed. Also, the message may just indicate that a slide has changed and the devices will determine which slide to display (e.g., the next slide).

In step 262, the devices determine the current slide 208 being displayed using the message. In step 264, current slide 208 is displayed on the devices. In one embodiment, current slide 208 is automatically displayed without any input from a user of the device. The method then reiterates to step 252 where communicator 104 monitors for the next slide change.

In the case where the devices do not have access to slides of presentation 112, in step 266, communicator 104 sends a message including the newly displayed slide 208 to the devices. Instead of including the slide, a link to current slide 208 that may be used to download the slide may also be sent. In either case, current slide 208 is sent to the devices.

In step 268, current slide 208 is displayed on the devices. In one embodiment, current slide 208 is automatically displayed without any input from a user of the device. The method then reiterates to step 252 where communicator 104 monitors for the next slide change.

Figure 4:
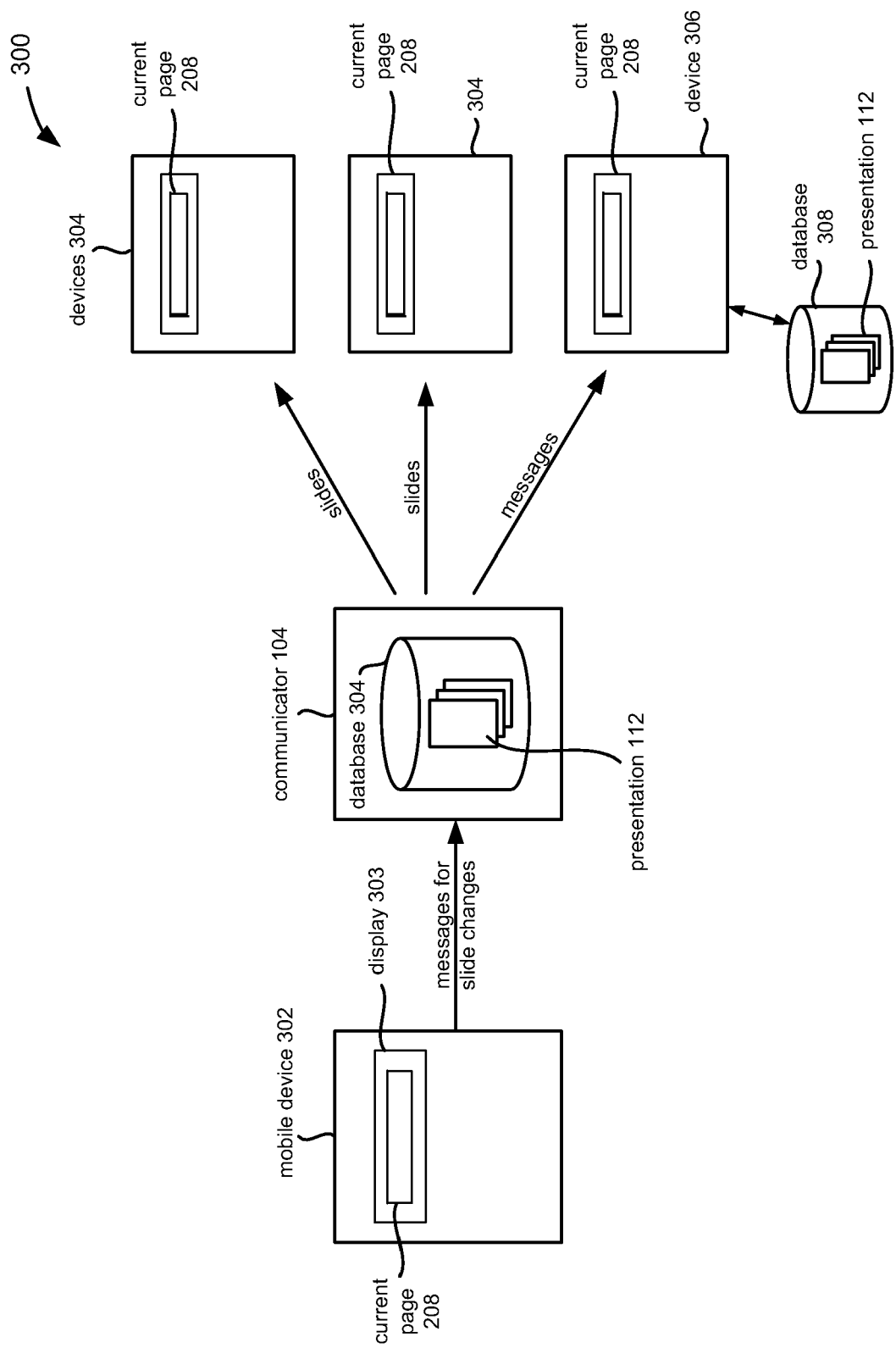
FIG. 4 depicts an embodiment of a system that enables a client device to run a presentation.

In addition to participating in a presentation being given, a user may use a client device to give a presentation. FIG. 4 depicts an embodiment of a system 300 that enables a client device 302 to run a presentation. As shown, client device 302 runs a presentation through communicator 104. In one embodiment, client device 302 determines when a new slide of presentation 112 has been displayed on a display 303 of client devices 302. When a slide has been changed, client device 302 sends a message indicating that a slide has been changed to communicator 104. The message may indicate which slide is being displayed or may indicate that a slide has been changed. Although client device 302 is shown as displaying current slide 208, it will be understood that client device 302 does not have to display current slide 208. For example, a person may be giving a presentation and when slides in presentation 112 are changed, the person selects a key on client device 302 or uses any other methods to indicate that a slide has been changed.

After receiving a message that a slide has been changed, communicator 104 sends messages to devices that are participating in the presentation. The devices may be display devices, computing devices, servers connected to a network of computing devices, other client devices, etc. Communicator 104 then determines the current slide that is being displayed using the received message and retrieves the slide from a database 304. Although communicator 104 is shown including database 304, it will be understood that database 304 may be remotely located but accessible by communicator 104.

Once current slide 208 is determined, communicator 104 may send it to devices 304 for display. Alternatively, communicator 104 may send a message to a device 306 that includes slides from presentation 112. Device 306 may then access the current slide 208 from a database 308 and display it. In one embodiment, when a slide is changed by client device 302, current slide 208 is displayed on devices 304 and 306 without any input from a user. Thus, participants may view slides in a presentation without manually changing them allowing a user of a client device to run a presentation remotely. For example, a user may be at an airport and other participants may be in a meeting room. The user can talk through client device 302 and also use client device 302 to automatically change slides on a television in the meeting room. In another embodiment, the user can set preferences, send/receive invitations, and send/receive answers to invitations, using the client device 302. User-set preferences may include where to be invited or notified/reminded of the meeting, what devices or addresses to use, how any media or multimedia presentation materials should be adapted, and the like.

Accordingly, embodiments allow a user to participate in a meeting using a client device. The pages displayed on the client device may be synchronized with page changes as new pages are being displayed in the presentation. A user thus does not have to manually change pages or receive verbal notifications that the page has been changed. Additionally, a video conference link is not necessary. It will be recognized that messages may be sent in a streaming media form.

Also, a user may give a presentation using a client device. The client device determines when a page has been changed and automatically sends a message that causes the new page to be displayed on other devices participating in the presentation.

Figure 5:
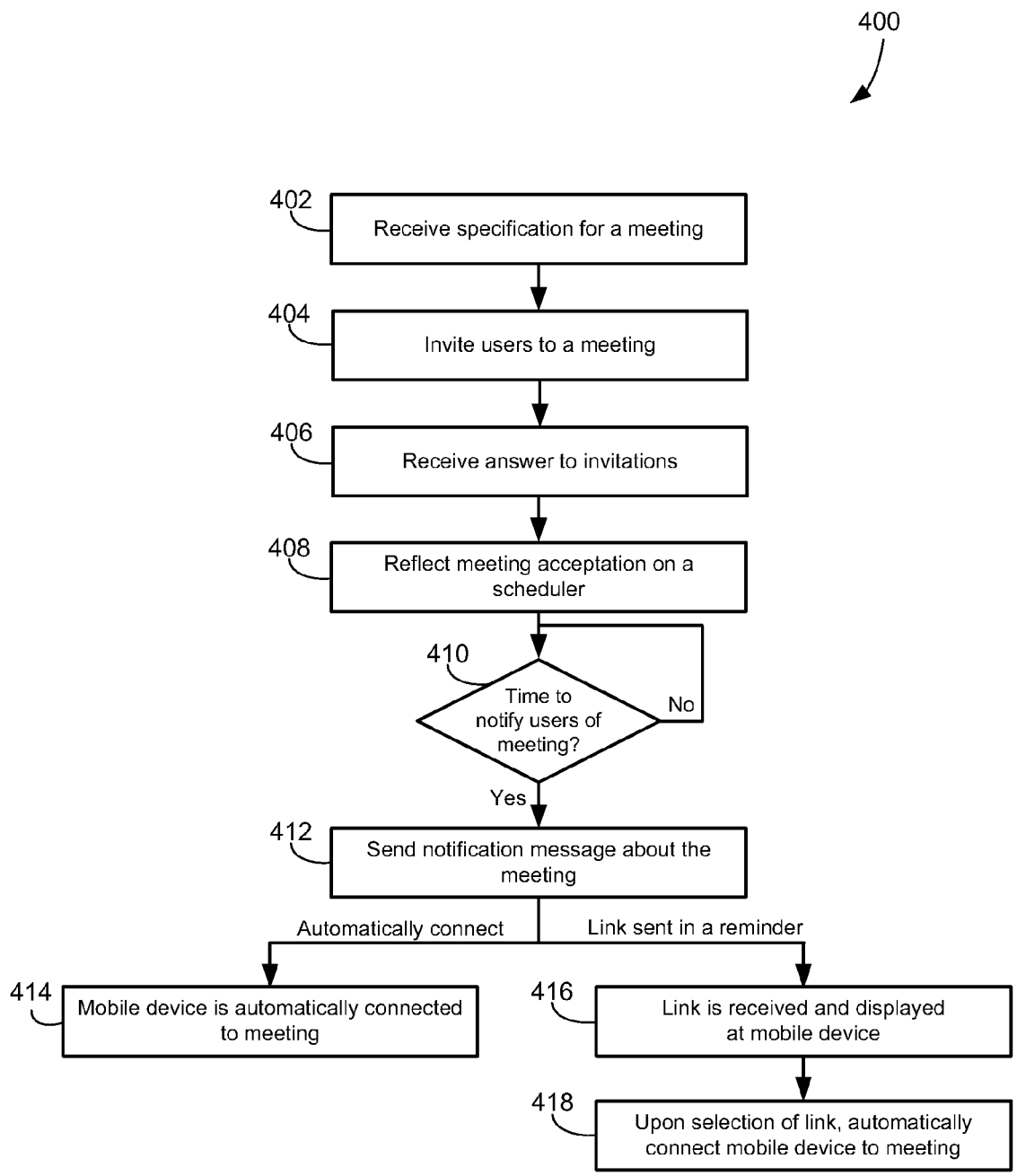
FIG. 5 depicts a flow chart of a method for automatically connecting to a meeting using a client device according to one embodiment.

In addition to being able to participate and run a presentation, a user may set up a meeting and/or be reminded of a meeting using a client device. When the user of a client device is notified of a meeting, the client device is provided methods for automatically connecting to the meeting. FIG. 5 depicts a flow chart 400 of a method for automatically connecting to a meeting using a client device within a network comprising the client device and a node according to one embodiment. Nodes may include a server, a peer device, and/or a third party. In one embodiment, the communication between the client device and node(s) is performed without any specific communication or messaging channel restrictions or assumptions.

In step 402, specifications for a meeting are received. For example, a user may specify the desired participants in the meeting, a meeting time, a type of meeting (tele-conference, video conference, presentation, etc.), rooms to reserve, what kind of devices will be connected to the meeting, what the device capabilities are and their preferences, etc. In one embodiment, rooms that may be reserved are sessions or conference identifiers and connection details (i.e., addresses, passwords, etc.) for the meeting. Examples of device capabilities may include how the device will participate in the meeting, such as using SMS, MMS, email, a voice call, a video conference, a web call, a presentation, etc.

In one embodiment, the client device may be configured to access standard meeting software, such as conference call notification by Lotus Notes, conference call setup by Raindance, Idem for on-line meetings, free-busy services for Microsoft Outlook, freetime/scheduling for Oracle calendar, Meeting for Oracle Collaboration Suite (OCS), and the like. The client device sends messages to a node to schedule a meeting. In one embodiment, the node is a central coordinator, such as communicator 104, to schedule the meeting. The messages may be SMS messages, emails, MMS messages, voice messages, fax messages, SIP/SIMPLE, etc. Communicator 104 is configured to interpret the messages and schedule the meeting using the appropriate software. For example, an SMS message may request that a meeting be scheduled using Lotus Notes at a certain time for people named Rob Smith and Jack Johnson. The node may then access the software or component that is used for calendaring or communicating for the user of the client device and attempt to schedule the meeting at the specified time for the users, Rob Smith, and Jack Johnson.

In one embodiment, a client device may issue an invitation by contacting a node, with a request for a meeting. Also, the client device may initiate a meeting request by entering the meeting into his/her client device's calendar. Then, the client device may automatically send the invitation to participate in a meeting to the node, which will send the invitations to other devices.

In step 404, multimedia/media session invitations are sent to various client devices and other devices associated with users that will be participating in the meeting. In one embodiment, the invitations are received by the various client devices. In other embodiments, the invitations are received by a user on the client device or another node associated with the user. The invitation to participate in the meeting may be received at the time of the meeting or before the meeting. In one embodiment, where the invitation to participate is sent before the meeting, a reminder mechanism is implemented, such as to trigger the next steps required. Invitations may be sent through email, SMS, MMS, voicemail, voice calls, fax messages, SIP/SIMPLE, etc. The invitations may describe the meeting details, such as one or more destination nodes to be invited to join the meeting. The destination nodes may be identified by an address, such as a uniform resource identifier (URI), a phone number, and the like. Meeting details of the invitation may also include information such as how to join the meeting, and also offer options to accept or reject the invitation. For example, a form may be provided with a question that requires a user to accept or reject the invitation for the meeting. Additionally, the form may give details about the meeting, such as which device(s) to invite, a phone number to call in case the device is disconnected, the time of the meeting, the address of the media server to join for voice and/or media conferencing and/or streaming, etc. Furthermore, the invitation may include the materials needed for the meeting, such as presentation media or multimedia or a URI to access the presentation or other ways to access the presentation ahead of the meeting. In one embodiment, the presentation media or multimedia includes slides or handouts for the presentation. The invitations may also be adapted to requirements for the client device. For example, a voice message may be sent if SMS messages cannot be received by a client device, the form may be in HTML, text or any other format the specific device can display, etc. In another embodiment, the materials needed for the meeting may be adapted for other devices, such that if the user wants to have another device join the meeting, the user may also want to communicate the device type of the other devices, and the slides or other media presentation materials (e.g., video) are prepared based on the specified device type.

In step 406, acceptances and rejections are received. In one embodiment, a client device user may accept the invitation by using a browser to download a webpage that enables the user to accept the invitation. Also, the client device may be used to accept the invitation via voice interaction using voice recognition or by using text messaging (SMS, MMS, email, instant message, etc.). As previously described, the invitation may be stored elsewhere than on the client device. As such, the acceptances or rejections may be provided by another peer device, server, or the media/conference server. In one embodiment, the user accepts and may suggest to connect later to one or multiple clients, where the client device can be the same or different from the device that the user uses. It should be noted that the user can set the foregoing as preferences. The acceptance or rejection is send to a node. In a preferred embodiment, a reminder or notification is scheduled as a result of receiving the user's response (i.e., acceptance). The scheduling may occur on some other node or on a same node. In another embodiment, the reminder or notification is scheduled when the invitation is sent.

In step 408, the acceptances may be reflected on a scheduler, such as the calendars of all participants and are stored. The synchronization of the calendars may be updated on any devices using over the air (OTA) vCal or iCal, syncML, synchronization (e.g., via Outlook), replications (e.g., via Lotus Notes) or any other methods needed to perform the update. In an alternative embodiment, the scheduler may be stored on any entity, such as a server, user device, or any other entity. Moreover, the scheduler may be stored in a calendar for the meeting or conference server.

In step 410, a node determines if it is time to notify a user of a meeting. The notification may come before the meeting when the meeting is about to start, or even after the meeting if the user has not connected to the meeting yet. It is determined whether the user should be notified about the meeting. Where the user has already connected to the meeting or the invitation was rejected, a user may not need to be notified of the meeting. As such, the node (e.g., application or operating system of client device, server, third party) which is responsible for notifying the user may be informed that the invitation was rejected.

In a first embodiment, in step 412, if it is time to notify a user of a meeting, a message about the meeting is sent, whereby the message enables or causes the client device to connect to the meeting. In one embodiment, the message about the meeting includes an instruction that causes the client device to connect to the meeting. The connection may occur automatically, that is, without any user action. The client device is automatically connected to a meeting, in step 414, in many ways.

In one embodiment, when the client device receives the message about the meeting, the message automatically connects the client device to the meeting, and the instruction causes the client to start the call to join the meeting. For example, the message may cause the client device to call a number to connect to a tele-conference. The instruction may tell the client how to join the conference. For example, in the context of a session initiation protocol (SIP) method invite, the instruction may include information about where to send the SIP method invite. In another embodiment, the message about the meeting may include a session initiation protocol (SIP) method invite. Also, the message may automatically display a slide in a presentation that is being given. For example, the message or a sequence of messages may include instructions which cause a local copy of the presentation saved on the client device to start, or the message may include an image of a current slide in the presentation or information as to where to download an adapted version of the presentation. As previously discussed, the local copy of the presentation may have been previously downloaded or sent with the invitation. In one embodiment, if the presentation has been updated since being sent out, an intermediate notification may be sent in order to synchronize the changes. Moreover, the one or more messages may cause the client device to initiate a call to join the meeting, for example, the message may automatically connect the client device to any on-line meetings, such as an instant message session with a user, a chat, a multimedia presentation, a video conference, and the like, based on the information of how to connect to the meeting. The meeting may include a multimedia presentation (i.e., video, web conference, etc.), multimedia session, and/or a voice-over-IP (VoIP) call.

In another embodiment, the client device is automatically connected to the meeting where the message about the meeting is sent to a peer device and/or server (i.e., conference server, media server, etc.) and the message includes an instruction that causes the same peer/server or another peer/server to start the call for the meeting. The instruction may tell the peer/server how to join the client to the meeting if not previously provided in the initial invitation and stored. For example, in the context of a SIP method invite, the instruction may include information about where to send the SIP method invite, for example, if the client address is different.

In another embodiment, the client device is automatically connected to the meeting where the message about the meeting is sent to a third party and the message includes an instruction that causes the third party to start the call and join the server and client to the meeting. In one embodiment, details about how to join the client and server to the meeting (e.g., via a third party call control or media session control between the client and a conference/media server) may be provided if not previously provided in the initial invitation and stored. In the context of a SIP method invite, a third party may establish a $3^{rd}$ Party SIP call control (e.g., as a B2BUA). For example, the third party calls the client device (e.g., by sending a message about the meeting) to put in a call with the server or a peer device. In another embodiment, the third party may instruct another node to invite in a third party call control. Thus, the client device may be automatically joined to the meeting by being called by the server, peer device, or a third party. In another embodiment, the third party may tell the client and/or conferencing/media server how to join a session.

If it is time to notify a user of a meeting, in step 412, in a second embodiment, a node sends a reminder to join the meeting to one or more client devices and/or other devices for the meeting. The reminder may be sent by and/or received by an application or operating system of the client device, server, peer device, and/or third party. The reminder message may display a link or button that may cause the client device to automatically connect to the meeting when selected, such as when a user manually clicks on the button. In one embodiment, this manual action also serves as a confirmation of acceptance. The link may include a uniform resource identifier (URI), an address, a protocol, an interface, or an application programming interface (API) with argument. In one embodiment, the initial invitation provided details on how to join the meeting (i.e., address, meeting identifier, credentials required, etc. ) and/or provided the presentation materials, which was stored by the client device. The reminder may remind the user to join the meeting or to start the stored presentation. In another embodiment, the reminder provides the details on how to join the meeting and/or the presentation materials for the meeting. The reminder may also be adapted to the requirements of the client device.

In the case where a link is sent, in step 416, the link is received and displayed on the client device. In one embodiment, the link may be a selectable button that is configured to connect to the meeting when selected. In other embodiments, the link includes meeting details, such as the call number, password, meeting title, participants, universal resource identifiers (URIs), etc. Although this information is given, the link will still automatically connect the client device to the meeting when selected.

In step 418, upon selection of the link, the client device is automatically connected to the meeting. For example, when a link is selected, a telephone number is dialed to join a telephone conference or the client device may be connected to an online meeting using instant messaging, an online presentation, a multimedia presentation, a video conference, an online chat, etc.

If a link does not work or if the user fails to show, in one embodiment, the client device or user may be contacted on a same or different device or communication channel to give the user information to connect to the meeting, files for the presentation, or start streaming multimedia information to the client device. In one embodiment, the client device or user is contacted based on preference, a profile, or presence, among other considerations.

In another embodiment, the user can contact a node. For example, messaging can be used to indicate new instructions, such as an address or telephone number and instructions on what to do in order to contact the user, for example, information on where to send, fax or print the presentation, information on where to call for the meeting, etc. In one embodiment, a user can contact an address or node through email, phone, interactive voice response (IVR), SMS, IM, etc. in order to make a request to have an invitation, reminder, or notification sent or resent to an address.

Figure 6:
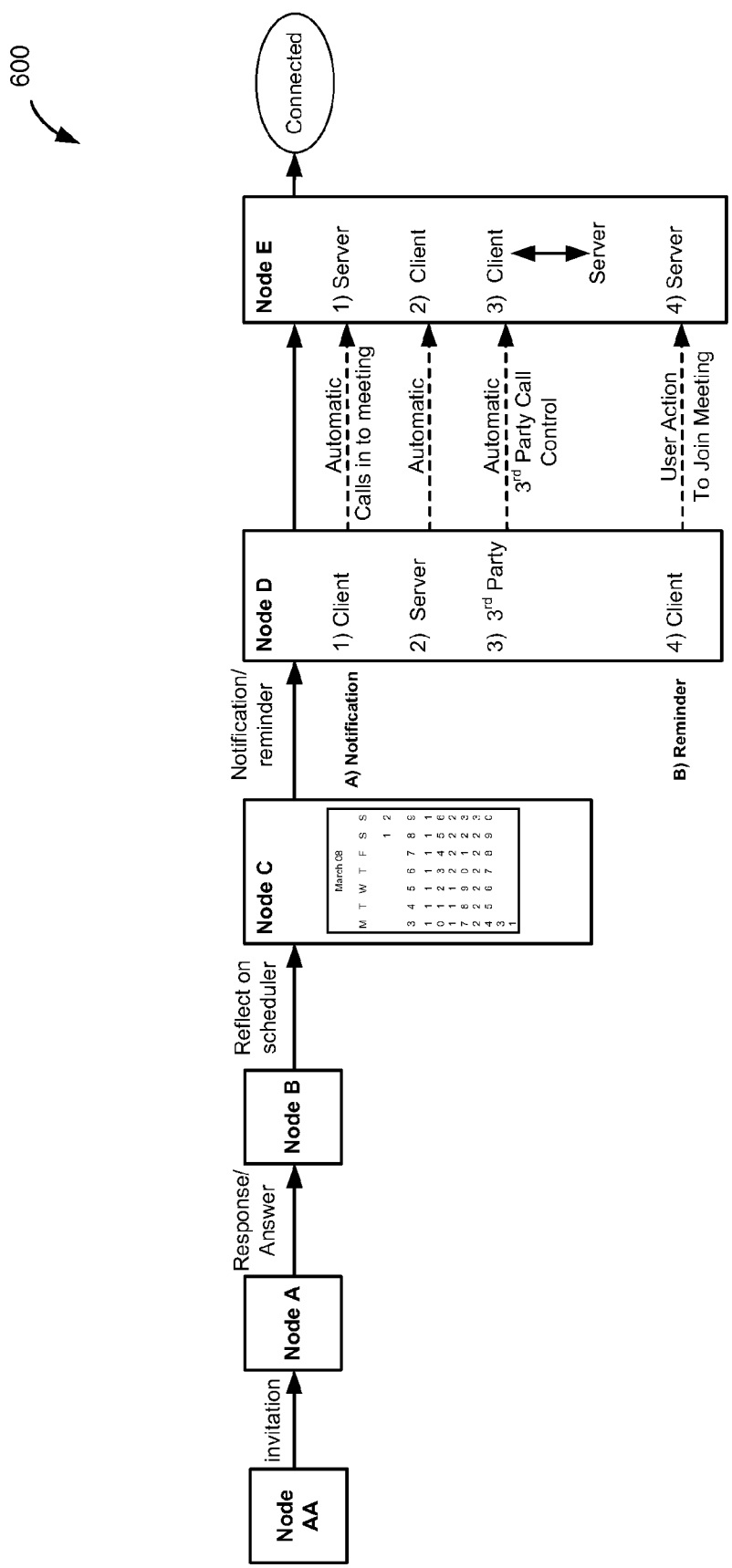
FIG. 6 depicts an embodiment of a system that enables a user to connect to a meeting using a client device according to one embodiment.

FIG. 6 depicts an embodiment of a system that enables a user to connect to a meeting using a client device according to one embodiment. System 600 includes Nodes AA-E within a network. Nodes may include a server, a peer device, and/or a third party. As shown, Node AA is a sender of an invitation. Node AA may be a client ending or a server allowing a user or service to invite others. In one embodiment, the server or service provider that offers services to send invites may also be Node B, and/or, Node C, and/or Node D. Moreover, a multimedia/media session invitation is received by Node A. Node A may be any device that is associated with the user, such as the client device, or another device. The user sends an answer or response to the invitation from Node A to Node B, which reflects the response on a scheduler of Node C. In one embodiment, Node B and C are different devices or servers or third parties. For example, Node B may be a first server and Node C may be another server. In another embodiment, Nodes B and C are the same device, server, or third party. For example, a user may send the response to a meeting server and the meeting server receives the response (Node B function) and reflects an acceptance on its own scheduler (Node C function). The invitation may include any one or more of the following information about the meeting: temporal information; presentation materials, how to access presentation materials; identifiers for other nodes to be included for the meeting, how to join the meeting, and options to accept or reject the invitation.

Node C, which includes the scheduler, determines if it is time to notify users of the meeting. In one embodiment, if the meeting is not accepted by the user, the meeting is not reflected on the scheduler and the scheduler does not notify the user of the meeting. If it is time to notify the user, a message about the meeting is sent from Node C to Node D. Node D may be the same device, server, or third party as Node B and/or C. For example, a user may send the response to a meeting server and the meeting server receives the response (Node B function), reflects an acceptance on its own scheduler (Node C function), and sends a notification about the meeting from the scheduler component of the meeting server to another component of the meeting server. In this example, Nodes B, C, and D are all parts of the meeting server. In another embodiment, Nodes B, C, and D are all different devices or servers or third parties. For example, Node B may be a meeting server, Node C may be another server, and Node D may be the client device.

The message about the meeting sent to Node D may be either a notification message or a reminder message. The notification message includes an instruction which causes the client device to automatically connect to the meeting, without user action. As shown in FIG. 6, there are three embodiments relating to notification messages. The notification message causes Node to automatically connect to Node E. In a first embodiment, Node D is a client device, which receives the notification message about the meeting. The instruction in the notification causes the client device to call into the meeting to Node E, without user interaction. For example, receives the notification message and is connected with Node E which is the meeting server. In a second embodiment, Node D is a server, which receives the notification message about the meeting. The instruction may cause the server (Node D) to start the call for the meeting and placing a call to the client device (Node E) and/or another other device. In a third embodiment, Node D is a third party, which receives the notification message about the meeting. The instruction may cause the third party (Node D) to start the call for the meeting and join the client device (Node E) and meeting server (Node E) to the meeting through a third party call control or media session control.

The message about the meeting may be a reminder message. The user is connected to the meeting via the reminder message by user action. The reminder message may display a link or button that may cause the client device to automatically connect to the meeting when selected, such as when a user manually clicks on the button. The reminder message requires user action to connect the user to the meeting in other ways. For example, the reminder message may include information that the user may use to connect to the meeting, such as a number to dial on a phone meeting. As shown in FIG. 6 as a fourth embodiment, Node D is a client which receives a reminder message. Upon user action, the client is joined with the meeting. For example, the client device (Node D) receives the reminder and a user may click on a link to connect with the meeting server (Node E).

Accordingly, embodiments allow a user of a client device to be automatically connected to a meeting. Thus, a user does not need to know the specifics of how to connect to the meeting because either a message causes the client device to connect to the meeting automatically or a link is provided that causes the client device to connect to the meeting upon selection. This may be very useful when a user is traveling and does not have access to information about the meeting. Thus, a user may be reminded about the meeting and also be automatically connected to the meeting using the reminder.

In one embodiment, instant messaging may also be used. For example, a chat or instant message system may be used between the client device and nodes. Instant messages may include invitations to participate in the meeting, notifications that a page has been changed in the meeting, notifications that a meeting is about to start, notifications that may be used to automatically connect to the meeting, etc. Instant message clients may also be used to send presentation media or multimedia, such as slides of presentations to client devices.

Embodiments provide many advantages. For example, client devices may participate in a presentation by having the presentation media or multimedia, such as slides, automatically displayed. Typically, a high bandwidth connection is needed for devices such as laptops to link to a presentation driver device. However, using a node, messages in other channels, such as SMS and MMS, are used to cause a client device to display the presentation media or multimedia, such as slides in a presentation. Thus, a client device that normally is not configured to directly interact with a presentation driver device can participate and display the presentation media or multimedia, such as slides in a presentation.

While the embodiments have been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for coordinating remote participation of a client device in a meeting within a network comprising the client device and one or more nodes, the meeting involving a multimedia presentation including presentation of one or more slides, the method comprising:
   receiving an invitation for the client device to participate in the meeting, wherein a user will participate in the meeting using the client device;
   receiving information indicating acceptance of the invitation by the user;
   storing temporal information about the meeting;
   determining whether to send a notification to the user of the meeting based on the stored temporal information and other information including the information indicating acceptance of the invitation by the user;
   in the event that the user should be notified,
   determining when to notify the user of the meeting based on the stored temporal information; and
   sending one or more messages about the meeting, the one or more messages causing the client device to connect to at least one of the one or more nodes and participate in the meeting with the at least one of the one or more nodes, determining when slides for the presentation have been changed; and in response to determining when a slide has been changed: determining a current slide in the one or more slides being displayed, and sending a message, to the client device, without a multimedia communication session connection with the client device, the message indicating that the current slide has been displayed, wherein the message enables the current slide to be displayed on the client device.

2. The method of claim 1, wherein the one or more messages about the meeting comprises a reminder to join the meeting.

3. The method of claim 2, wherein the reminder comprises a link, wherein upon selection of the link, the client device is connected to the meeting.

4. The method of claim 3, wherein the link comprises a uniform resource identifier (URI), an address, a protocol, an interface, or an application programming interface (API) with arguments.

5. The method of claim 2, further comprising:
receiving specifications of the client device for the meeting; and
adapting the reminder based on the specifications.

6. The method of claim 2, wherein the reminder is sent by an application of the client device to the user of the client device.

7. The method of claim 1, wherein the one or more messages about the meeting comprises an instruction to cause the client device to connect to the meeting when the client device receives the one or more messages, wherein the connection occurs without user action.

8. The method of claim 7, wherein the instruction causes the client device to connect to the meeting by initiating a call to join the meeting.

9. The method of claim 7, wherein the instruction causes a server or a peer device to connect the client device to the meeting by calling the client device to join the meeting.

10. The method of claim 7, wherein the instruction causes a third party to connect the client device to the meeting by joining the client device and at least one of a server or a peer device to the meeting.

11. The method of claim 7, wherein the client device is connected to the meeting using a session initiation protocol (SIP) method invitation.

12. The method of claim 11, wherein a third party establishes a SIP call control between the client device and the one or more nodes.

13. The method of claim 12, wherein the instruction includes information about how the third party joins the client device and the one or more nodes to the meeting.

14. The method of claim 7, wherein the one or more messages causes the client device to connect to the meeting by displaying a current slide in the multimedia presentation.

15. The method of claim 7, wherein the one or more messages are sent by a first node of the one or more nodes, wherein the first node is a server or a peer device or a third party.

16. The method of claim 1, wherein information on how to join the meeting is provided in the invitation or in the one or more messages about the meeting.

17. The method of claim 16, further comprising:
storing the information on how to join the meeting where the information on how to join the meeting is provided in the invitation.

18. The method of claim 16, wherein the client device initiates connection to the meeting using the information on how to join to the meeting.

19. The method of claim 1, further comprising:
receiving specifications of the client device for the meeting; and
adapting the multimedia presentation based on the specifications.

20. The method of claim 1, wherein a form of communication of the invitation or a form of communication of the one or more messages are determined based on one or more forms of communication that are acceptable by the client device.

21. The method of claim 1, further comprising:
receiving a user input from a user interface of the client device, the user input indicating an acceptance of the invitation or a rejection of the invitation to participate in the meeting.

22. The method of claim 18, wherein the one or more messages about the meeting are not sent where the user input indicates rejection of the invitation to participate in the meeting.

23. The method of claim 1, wherein the one or more messages are sent by a node within the network to the client device.

24. The method of claim 1, further comprising:
storing destination information which identifies a destination node of the one or more nodes; and
sending the one or more messages about the meeting to the destination node.

25. The method of claim 1, wherein the invitation is sent by a server node which provides a service of sending invitations, and wherein the server node performs the steps of storing temporal information and/or determining whether to notify and/or determining when to notify and/or sending the one or more messages about the meeting.

26. A data processing system for coordinating remote participation of a client device in a meeting within a network comprising the client device and one or more nodes, the meeting involving a multimedia presentation including presentation of one or more slides, the data processing system comprising:
a first receiver module receives an invitation for the client device to participate in the meeting and information indicating acceptance of the invitation by a user, wherein the user will participate in the meeting using the client device;
a storage module stores temporal information about the meeting;
a notification module determines whether to notify the user of the meeting based on the stored temporal information and other information including the information indicating acceptance of the invitation by the user, in the event that the user should be notified,
determining when to send a notification to the user of the meeting based on the stored temporal information; and
sending one or more messages about the meeting, the one or more messages causing the client device to connect to at least one of the one or more nodes and participate in the meeting with the at least one of the one or more nodes, determining when slides for the presentation have been changed; and in response to determining when a slide has been changed: determining a current slide in the one or more slides being displayed, and sending a message, to the client device, without a multimedia communication session connection with the client device, the message indicating that the current slide has been displayed, wherein the message enables the current slide to be displayed on the client device.

27. The system of claim 26, wherein the one or more messages about the meeting comprises a reminder to join the meeting.

28. The system of claim 27, further comprising:
- a second receiver module receives specifications of the client device for the meeting;
- an adapter module adapts the reminder based on the specifications.

29. The system of claim 27, wherein the notification module is an application of the client, and wherein the reminder is sent to the user of the client device.

30. The system of claim 26, wherein the one or more messages about the meeting comprises an instruction to cause the client device to connect to the meeting when the client device receives the one or more messages, wherein the connection occurs without user action.

31. The system of claim 30, wherein the instruction causes the client device to connect to the meeting by initiating a call to join the meeting.

32. The system of claim 30, wherein the instruction causes a server or a peer device to connect the client device to the meeting by calling the client device to join the meeting.

33. The system of claim 30, wherein the instruction causes a third party to connect the client device to the meeting by joining the client device and at least one of a server or a peer device to the meeting.

* * * * *